US008830220B2

(12) United States Patent
Woo et al.

(10) Patent No.: US 8,830,220 B2
(45) Date of Patent: Sep. 9, 2014

(54) DISPLAY DEVICE DRIVING CIRCUIT UTILIZING VOLTAGE MAINTENANCE FOR POWER CONSUMPTION REDUCTION AND DISPLAY DEVICE USING THE SAME

(75) Inventors: Jae Hyuck Woo, Osan-si (KR); In-Suk Kim, Suwon-si (KR); Jae Goo Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 545 days.

(21) Appl. No.: 12/852,818

(22) Filed: Aug. 9, 2010

(65) Prior Publication Data

US 2011/0037750 A1 Feb. 17, 2011

(30) Foreign Application Priority Data

Aug. 11, 2009 (KR) ........................ 10-2009-0073587

(51) Int. Cl.
*G06F 3/038* (2013.01)
*G09G 5/00* (2006.01)

(52) U.S. Cl.
USPC .................. 345/211; 345/87; 349/33; 349/37

(58) Field of Classification Search
USPC ................ 345/211; 349/19–55; 359/245–324
See application file for complete search history.

(56) References Cited

U.S. PATENT DOCUMENTS

| | | | | |
|---|---|---|---|---|
| 2005/0007324 | A1 * | 1/2005 | Inada | 345/87 |
| 2005/0088394 | A1 | 4/2005 | Chung | |
| 2008/0290909 | A1 | 11/2008 | Chung | |
| 2009/0009446 | A1 | 1/2009 | Kamijo et al. | |
| 2010/0220084 | A1 * | 9/2010 | Chiang et al. | 345/211 |

FOREIGN PATENT DOCUMENTS

| | | | |
|---|---|---|---|
| JP | 2005-134910 | A | 5/2005 |
| JP | 2008-107800 | A | 5/2008 |
| KR | 10-2005-0040790 | A | 5/2005 |
| KR | 10-2008-0028811 | A | 4/2008 |
| KR | 10-0866968 | B1 | 10/2008 |

* cited by examiner

*Primary Examiner* — Gerald Johnson
(74) *Attorney, Agent, or Firm* — Lee & Morse, P.C.

(57) ABSTRACT

A driving circuit of a display device is provided. The driving circuit applies a first external voltage to a source line of a display panel before a source driving voltage is applied to the source line and applies at least one second external voltage to a common electrode of the display panel before one between a first common voltage and a second common voltage is applied to the common electrode, thereby reducing the driving power of the display device.

27 Claims, 11 Drawing Sheets

DISPLAY DEVICE DRIVING CIRCUIT UTILIZING VOLTAGE MAINTENANCE FOR POWER CONSUMPTION REDUCTION AND DISPLAY DEVICE USING THE SAME

BACKGROUND

1. Field

Embodiments relate to a technique of driving a display device, and more particularly, to a driving circuit for controlling a source driving voltage applied to a source line of a display panel and a common voltage applied to a common electrode of the display panel and a display device including the driving circuit.

2. Description of the Related Art

Various types of flat display devices such as a liquid crystal display (LCD), a plasma display panel (PDP), and an electroluminescence display panel have been developed to replace a traditional cathode ray tube (CRT). Recently, with the spread of various mobile electronic devices, demand on compactness, lightness, and low power consumption has been increased with respect to the flat display devices. In particular, considering that limitation of use is the weakest point of mobile electronic devices, low power consumption is the critical criteria for evaluation of the performance of mobile electronic devices as well as normal electronic devices.

The most important issue in reducing the power consumption of display devices is reducing the current consumption of a driving circuit which applies a common voltage to a common electrode of a display panel and a source driving voltage to a source line of the display panel.

SUMMARY

Embodiments are therefore directed to a driving circuit and a display device including the same, which substantially overcome one or more of the problems due to the limitations and disadvantages of the related art.

Some embodiments provide a driving circuit for reducing current consumed in a source driving circuit and a common voltage driving circuit and a display device including the same.

According to some exemplary embodiments, there is provided a driving circuit driving a display panel. The driving circuit includes a source driving circuit, a common voltage driving circuit, and a control circuit. The source driving circuit may apply a source driving voltage to a source line of a display panel. The common voltage driving circuit may alternately apply a first common voltage and a second common voltage higher than the first common voltage to a common electrode of the display panel. The control circuit may apply a first external voltage to the source line before the source driving voltage is applied to the source line and apply at least one second external voltage to the common electrode before one of the first common voltage is applied to the common electrode or the second common voltage is applied to the common electrode.

The control circuit may include a first control circuit configured to apply the first external voltage to the source line in response to a first control signal and a second control circuit configured to apply the at least one second external voltage to the common electrode in response to at least one second control signal. The first external voltage may have a value between a maximum and a minimum of the source driving voltage and the at least one second external voltage may have a value between the first common voltage and the second common voltage.

The control circuit may apply the at least one second external voltage to the common electrode sequentially from a highest to a lowest voltage before the first common voltage is applied to the common electrode and may apply the at least one second external voltage to the common electrode sequentially from the lowest to the highest voltage before the second common voltage is applied to the common electrode. At this time, the first external voltage and a second external voltage corresponding to the first external voltage among the at least one second external voltage may be applied to the source line and the common electrode, respectively, at the same time or at different times.

The control circuit may float the source line during a predetermined period of time when a voltage applied to the common electrode and the source driving voltage change in phase with each other.

The control circuit may apply at least one more first external voltage before the source driving voltage is applied to the source line when a voltage applied to the common electrode and the source driving voltage change out of phase with each other.

The control circuit may compare a digital signal corresponding to a current source driving voltage with a digital signal corresponding to a previous source driving voltage and determine whether the voltage applied to the common electrode and the source driving voltage change in phase or out of phase with each other based on a result of the comparison.

According to other embodiments, a display device including the above-described driving circuit is provided.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
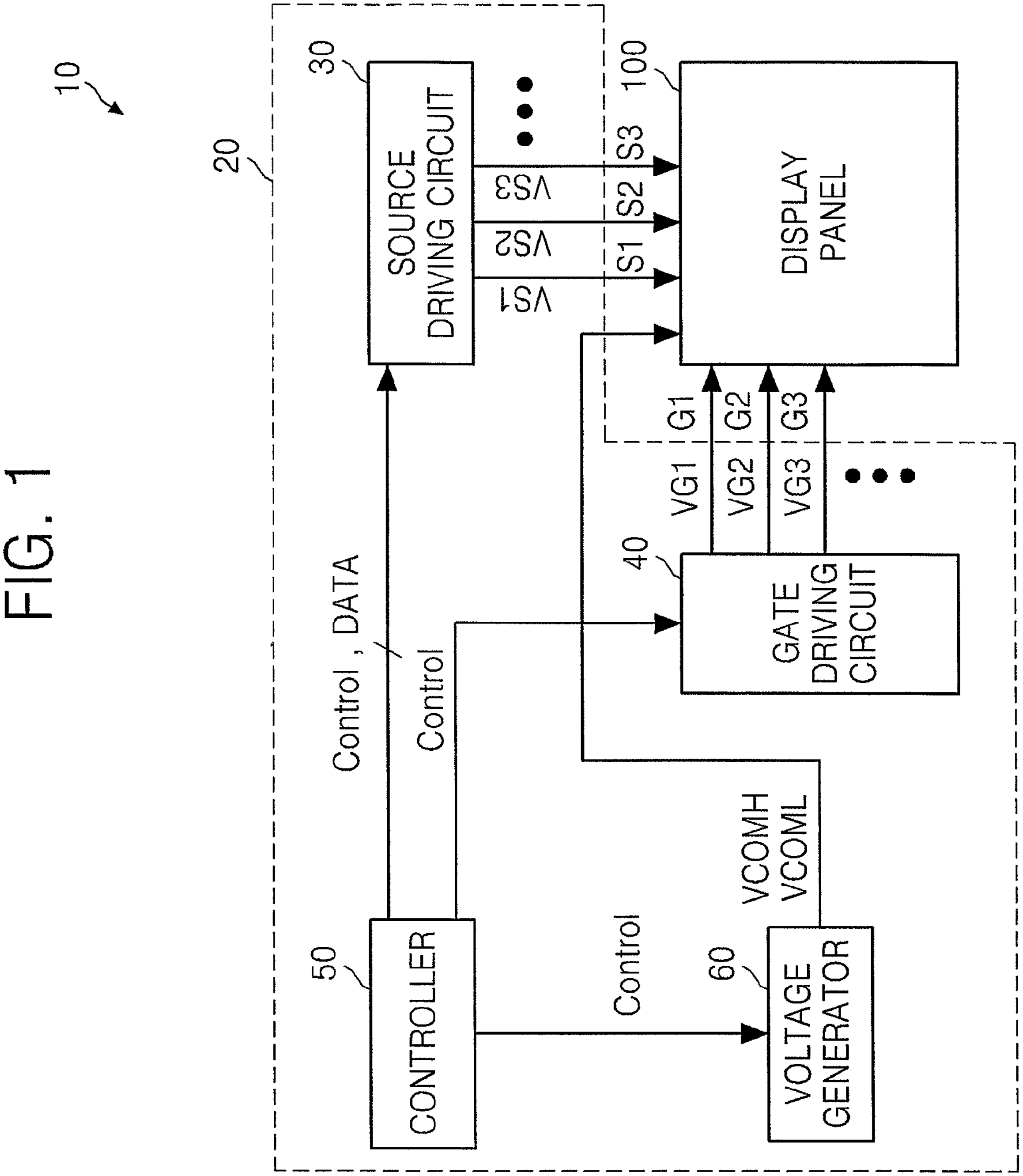
FIG. 1 illustrates a block diagram of a display device according to an embodiment.

Korean Patent Application No. 10-2009-0073587 filed on Aug. 11, 2009, in the Korean Intellectual Property Office, and entitled: "Display Device and Driving Circuit Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 illustrates a block diagram of a display device 10 according to an embodiment. The display device 10 includes a driving circuit 20 and a display panel 100. The driving circuit 20 includes a plurality of elements, i.e., a source driving circuit 30, a gate driving circuit 40, a controller 50, and a voltage generator 60, which drive and control the display panel 100.

The controller 50 generates a plurality of control signals for controlling the source driving circuit 30, the gate driving circuit 40, and the voltage generator 60. The display panel 100 includes a plurality of source lines S1, S2, and S3 connected to the source driving circuit 30, a plurality of gate lines G1, G2, and G3 connected to the gate driving circuit 40, and a plurality of pixels (not shown) arranged in a matrix of rows and columns.

The display panel 100 displays images based on common voltages VCOMH and VCOML from the voltage generator 60, source driving voltages VS1, VS2, and VS3 from the source driving circuit 30, and gate driving voltages VG1, VG2, and VG3 from the gate driving circuit 40. That the voltage generator 60 applies voltages to the source driving circuit 30, the gate driving circuit 40, and the controller 50 is not shown in FIG. 1.

Figure 2:
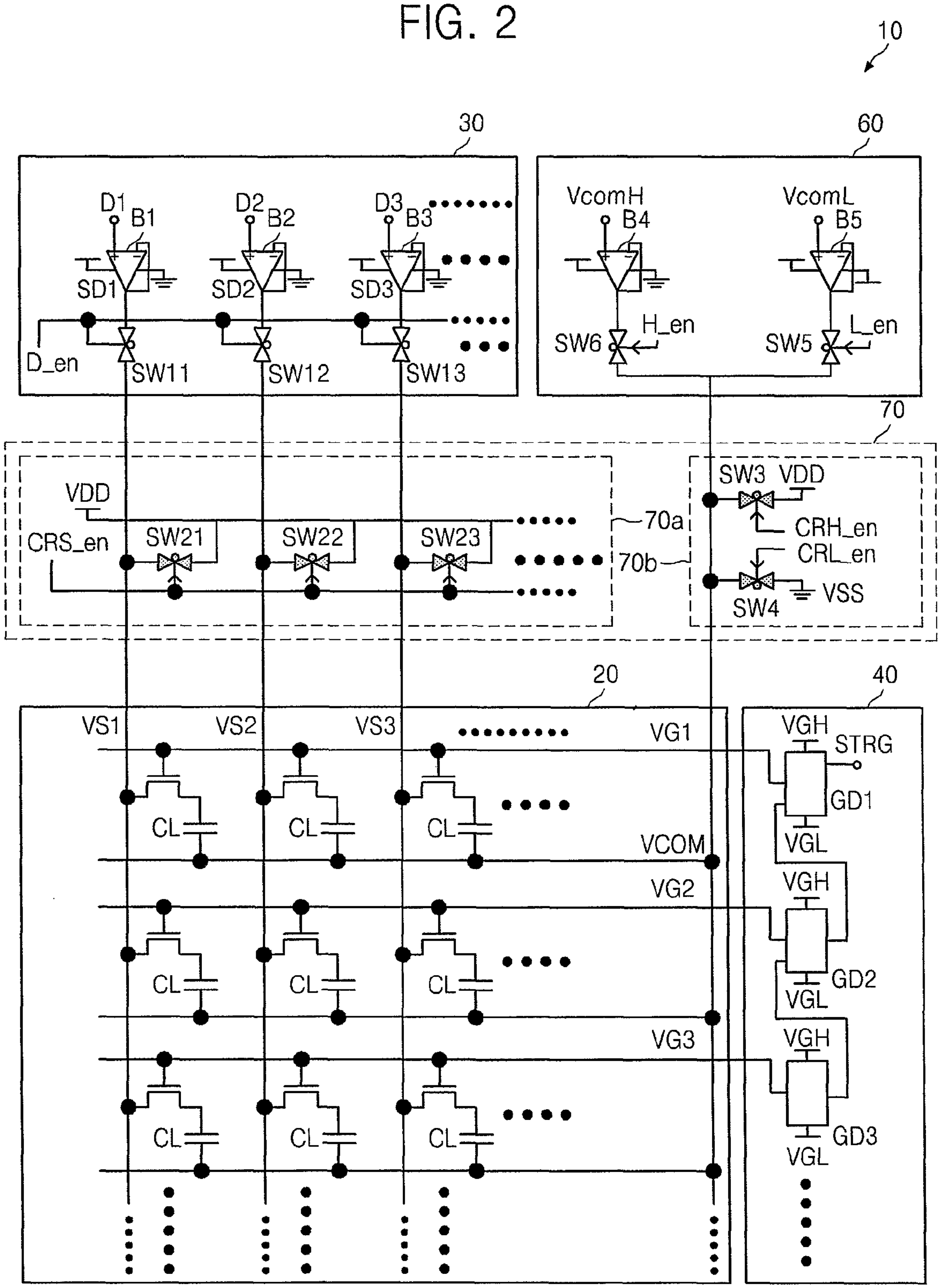
FIG. 2 illustrates a circuit diagram of a portion of the display device illustrated in FIG. 1 according to an embodiment.

FIG. 2 illustrates a circuit diagram of a portion of the display device 10 illustrated in FIG. 1. The operations of the display device 10 will be described in detail with reference to FIGS. 1 and 2. The display device 10 illustrated in FIG. 2 includes a control circuit 70 which controls a voltage applied to a source line of the display panel 100 and a voltage applied to a common electrode of the display panel 100.

Referring to FIG. 2, a pixel included in the display panel 100 is represented by a capacitor CL connected to a source line Sx via a transistor gated with a gate voltage VGx applied through a gate line Gx, where "x" is a natural number. The display panel 100 is a liquid crystal display (LCD) panel. Hereinafter, embodiments will be described by explaining the operation of reducing power consumption in a display device using an LCD panel.

The source driving circuit 30 applies source driving voltages SD1, SD2, and SD3 to the source lines S1, S2, and S3 of the display panel 100. The source driving circuit 30 includes a plurality of buffers B1, B2, and B3 which buffer input source driving voltages D1, D2, and D3 to generate the source driving voltages SD1, SD2, and SD3, respectively. The source driving voltages SD1, SD2, and SD3 are selectively output to the source lines S1, S2, and S3, respectively, by a plurality of switches SW11, SW12, and SW13, respectively, driven by a control signal D_en. Here, a source driving voltage may be a driving voltage output from the source driving circuit 30 or a source driving voltage substantially applied to each of the source lines S1, S2, and S3 according to the voltage control of the control circuit 70. Both voltages may be distinguished by reference numerals.

The gate driving circuit 40 sequentially applies the gate voltages VG1, VG2, and VG3 to the gate lines G1, G2, and G3, respectively, included in the display panel 100 in response to a control signal STRG. The gate driving circuit 40 includes a plurality of gate driving elements GD1, GD2, and GD3 connected in series with each other. Each of the gate driving elements GD1, GD2, and GD3 alternately outputs a first gate voltage VGH and a second gate voltage VGL.

In FIG. 2, only a common voltage driving circuit is illustrated to be included in the voltage generator 60. Alternatively, the common voltage driving circuit may not be included in the voltage generator 60 but may be implemented as a separate circuit.

The common voltage driving circuit 60 alternately applies the first common voltage VCOML and the second common voltage VCOMH higher than the first common voltage VCOML to a common electrode VCOM of the display panel 100. The common voltage driving circuit 60 includes a buffers B4 and B5 buffering the first common voltage VCOML and the second common voltage VCOMH and switches SW5 and SW6 selectively outputting output signals of the buffers B4 and B5 to the common electrode VCOM in response to control signals L_en and H_en.

The control circuit 70 includes a first control circuit 70*a* and a second control circuit 70*b*. The first control circuit 70*a* applies a first external voltage VDD to the source lines S1, S2, and S3 in response to a control signal CRS_en before the source driving voltages SD1, SD2, and SD3 are respectively applied to the source lines S1, S2, and S3.

The first external voltage VDD has a value between the maximum and the minimum of a source driving voltage VSx. Accordingly, the first control circuit 70*a* maintains the voltages of the source lines S1, S2, and S3 at a value between the maximum and the minimum of the source driving voltage VSx before the source driving voltages SD1, SD2, and SD3 are applied to the source lines S1, S2, and S3.

When the voltages of the source lines S1, S2, and S3 are maintained at the value between the maximum and the minimum of the source driving voltage VSx before the source driving voltage VSx is applied to the source lines S1, S2, and S3, rapid changes in the voltages of the source lines S1, S2, and S3 are prevented. As a result, power consumption of the source driving circuit 30 is reduced. In addition, since an external voltage is used, a separate circuit for generating a voltage between the maximum and the minimum of the source driving voltage VSx is not necessary.

The first control circuit 70*a* includes a plurality of switches SW21, SW22, and SW23 which selectively outputs the first external voltage VDD to the source lines S1, S2, and S3, respectively, in response to a control signal CRS_en. Here, the external voltage VDD is a voltage necessary to operate the driving circuit 20 of the display device 10 and is externally applied to the driving circuit 20.

The second control circuit 70*b* applies one or more second external voltages VDD and VSS to the common electrode VCOM before either of the first and second common voltages VCOML and VCOMH is applied to the common electrode VCOM. The one or more second external voltages VDD and VSS are voltages between the first common voltage VCOML and the second common voltage VCOMH. Accordingly, the second control circuit 70*b* can maintain the voltage of the common electrode VCOM at the voltage between the first common voltage VCOML and the second common voltage VCOMH before the first common voltage VCOML or the second common voltage VCOMH is applied to the common electrode VCOM.

When the voltage of the common electrode VCOM is maintained at a voltage between the first common voltage VCOML and the second common voltage VCOMH before the first common voltage VCOML or the second common voltage VCOMH is applied to the common electrode VCOM, a rapid change in the voltage of the common electrode VCOM is prevented. As a result, power consumption of the common voltage driving circuit 60 is reduced. In addition, since an external voltage is used, a separate circuit for generating a voltage between the first common voltage VCOML and the second common voltage VCOMH is not necessary.

The second control circuit 70*b* may apply the one or more second external voltages VDD and VSS sequentially from the highest to the lowest voltage to the common electrode VCOM before the first common voltage VCOML is applied to the common electrode VCOM and may apply the one or more second external voltages VDD and VSS sequentially from the lowest to the highest voltage to the common electrode VCOM before the second common voltage VCOMH is applied to the common electrode VCOM. For instance, before the first common voltage VCOML is applied to the common electrode VCOM after the second common voltage VCOMH is applied to the common electrode VCOM, the second control circuit 70*b* may sequentially apply the power supply voltage VDD and the ground voltage VSS, which correspond to voltages between the first common voltage VCOML and the second common voltage VCOMH, to the common electrode VCOM. Contrarily, before the second common voltage VCOMH is applied to the common electrode VCOM after the first common voltage VCOML is applied to the common electrode VCOM, the second control circuit 70*b* may sequentially apply the ground voltage VSS and the power supply voltage VDD, which correspond to voltages between the first common voltage VCOML and the second common voltage VCOMH, to the common electrode VCOM.

The second control circuit 70*b* includes one or more switches SW3 and SW4 which selectively apply the one or more second external voltages VDD and VSS, respectively, to the common electrode VCOM in response to one or more control signals CRH_en and CRH_en, respectively. The first external voltage VDD and the second external voltage VDD corresponding to the first external voltage VDD may be applied to a source line Sx and the common electrode VCOM, respectively, at the same time or at different times.

Figure 3:
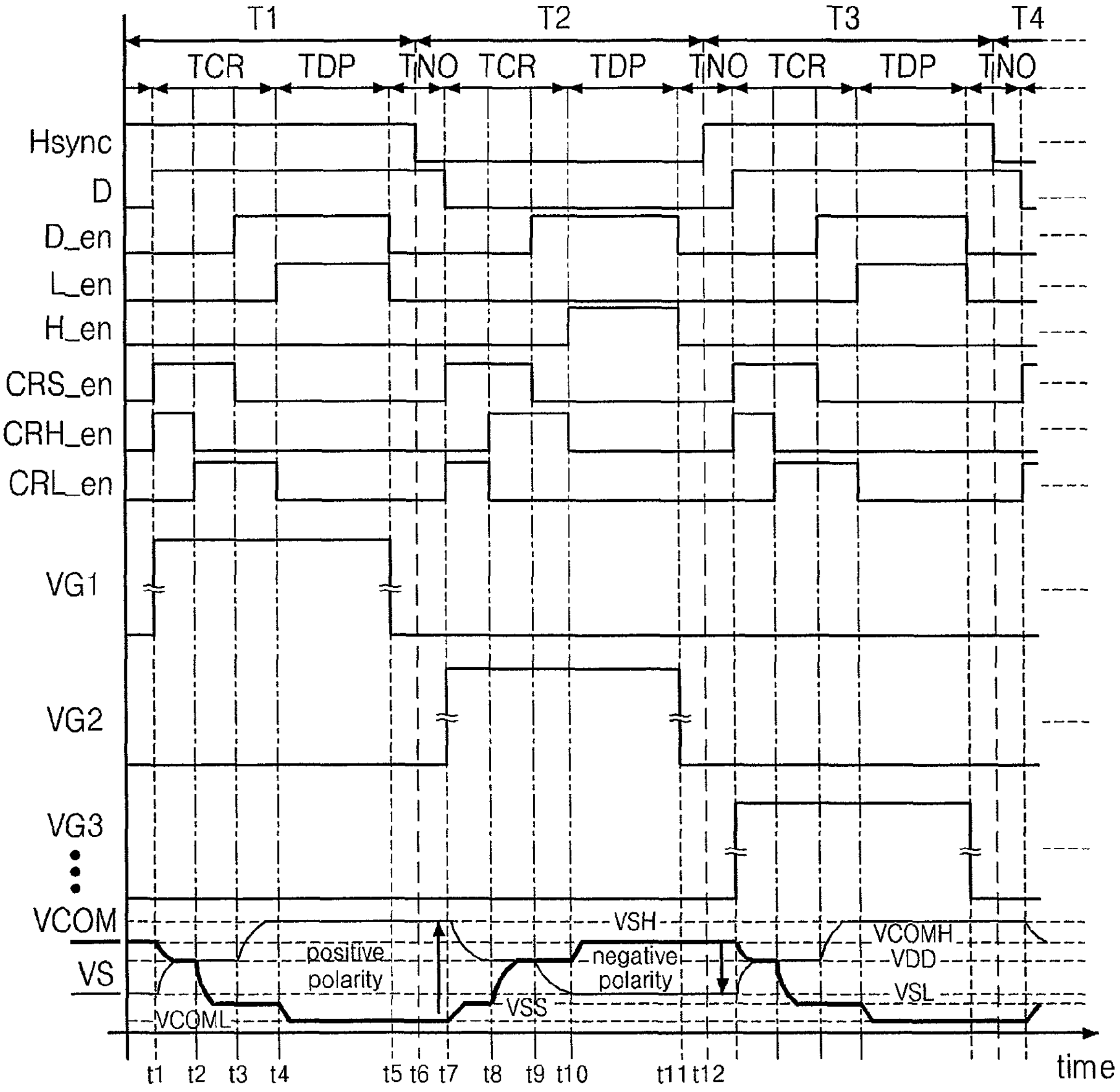
FIG. 3 illustrates a timing chart of the operation of a driving circuit of the display device, illustrated in FIG. 2, for reducing current consumption according to an embodiment.

FIG. 3 illustrates a timing chart of the operation of the driving circuit 20 for reducing current consumption according to an embodiment. In particular, the timing chart illustrated in FIG. 3 shows the operation of the driving circuit 20 of an LCD, in which the polarities of a common voltage VCOM and a source driving voltage VS are inverted periodically. The operation of the driving circuit 20 will be described with reference to FIGS. 1 through 3 below.

The common voltage VCOM and the source driving voltage VS are periodically inverted. In driving periods T1 and T3, the common voltage VCOM is inverted from the second common voltage VCOMH to the first common voltage VCOML and the source driving voltage VS is inverted from a first source driving voltage VSL to a second source driving voltage VSH. However, in driving periods T2 and T4, the common voltage VCOM is inverted from the first common voltage VCOML to the second common voltage VCOMH and the source driving voltage VS is inverted from the second source driving voltage VSH to the first source driving voltage VSL. The driving periods T1 through T4 of the driving circuit 20 are defined by periods of a horizontal synchronous signal Hsync. In FIG. 3, a positive polarity indicates that the common electrode VCOM is the second common voltage VCOMH and a negative polarity indicates that the common voltage VCOM is the first common voltage VCOML.

In a period TCR, the control circuit 70 controls the source driving voltage VS and the common voltage VCOM. In a period TDP, a voltage for displaying an image on the display panel 100 is applied to a source line Sx. A period TNO is from a time when the gate driving voltage VGx is deactivated to a time when the control circuit 70 starts a control operation.

At a time t1 when a source driving voltage D is applied to a buffer of the source driving circuit 30, the first control circuit 70*a* applies the power supply voltage VDD to the source line Sx in response to the control signal CRS_en; the second control circuit 70*b* applies the power supply voltage VDD to the common electrode VCOM in response to the control signal CRH_en; and the gate driving circuit 40 applies the first gate voltage VG1 to the gate line G1. Then, the common voltage VCOM transits from the second common voltage VCOMH to the power supply voltage VDD and the source driving voltage VS transits from the first source driving voltage VSL to the power supply voltage VDD.

At a time t2, the second control circuit 70*b* applies the ground voltage VSS to the common electrode VCOM in response to the control signal CRL_en. Then, the common voltage VCOM transits from the power supply voltage VDD to the ground voltage VSS. At a time t3, the switch SW1*x* of the source driving circuit 30 outputs a data signal in response to the control signal D_en. Then, the source driving voltage VS transits from the power supply voltage VDD to the second source driving voltage VSH.

At a time t4 when the switch SW5 of the common voltage driving circuit 60 outputs the first common voltage VCOML to the common electrode VCOM in response to the control signal L_en, the common voltage VCOM transits from the ground voltage VSS to the first common voltage VCOML. At a time t5, the gate voltage VG1 is deactivated. At a time t6, the horizontal synchronous signal Hsync transits to a low level.

In a period from the time t1 to the time t6 described above, the common voltage VCOM transits from the second common voltage VCOMH to the first common voltage VCOML and the source driving voltage VS transits from the first source driving voltage VSL to the second source driving voltage VSH. In a period from a time t7 to a time t12, the common voltage VCOM transits from the first common voltage VCOML to the second common voltage VCOMH and the source driving voltage VS transits from the second source driving voltage VSH to the first source driving voltage VSL. The transition procedure in the period from the time t7 to the time t12 is similar to that in the period from the time t1 to the time t6. Thus, a detailed description thereof will be omitted. After the time t12, the operation performed in a period from the time t1 to the time t12 is repeated. Here, the power supply voltage VDD is simultaneously applied to the source line Sx and the common electrode VCOM at the time t1.

As described above, in the transition of the common voltage VCOM between the first common voltage VCOML and the second common voltage VCOMH, the power supply voltage VDD and the ground voltage VSS between the first common voltage VCOML and the second common voltage VCOMH are sequentially applied to the common electrode VCOM. In the transition of the source driving voltage VS between the first source driving voltage VSL and the second source driving voltage VSH, the ground voltage VSS is applied. At this time, a power consumption P1 of the driving circuit 20 is expressed by Equation (1):

$$P1 = N \times CL \times \frac{1}{2} \times f \times VDD \times (VSH - VSL + 2(VCOMH - VCOML) - VDD) \tag{1}$$

where CL is a capacitance of the capacitor CL, N is the number of pixels, "f" is a driving frequency, VDD is an external voltage, VSL is a first source driving voltage, VSH is a second source driving voltage, a VCOML is a first common voltage, and VCOMH is a second common voltage.

Figure 4:
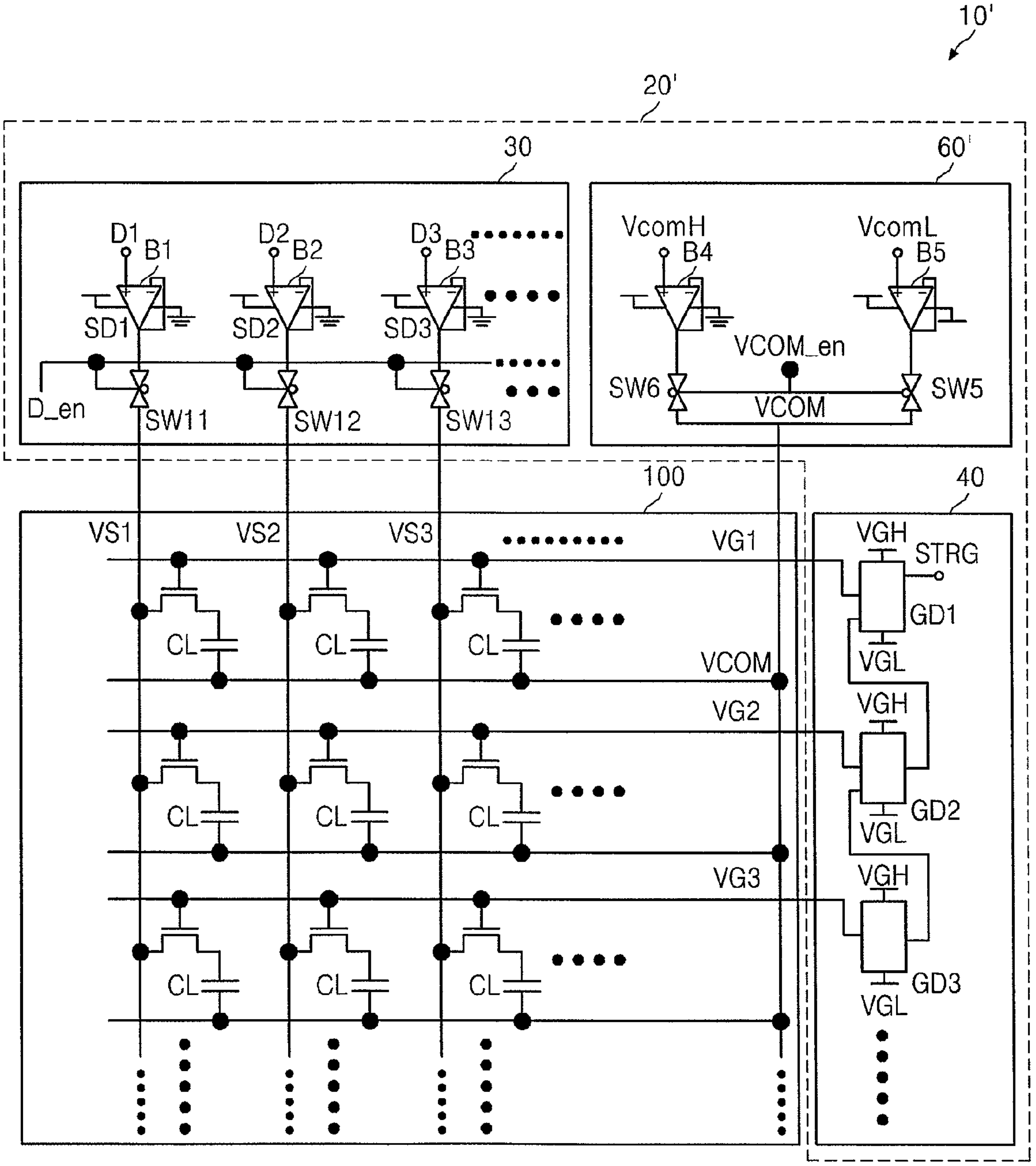
FIG. 4 illustrates a circuit diagram of a display device which does not include a control circuit illustrated in FIG. 2.

FIG. 4 is illustrates a circuit diagram of a display device 10' which does not include the control circuit 70 illustrated in FIG. 2. A common voltage driving circuit 60' included in the display device 10' alternately outputs the first common voltage VCOML and the second common voltage VCOMH in response to a control signal VCOM_en. A power consumption P2 of a driving circuit 20' included in the display device 10' is expressed by Equation (2):

$$P2 = N \times CL \times \frac{1}{2} \times f \times VDD \times 5 \times (VSH + VCOMH - VSL - VCOML) \tag{2}$$

Figure 5:
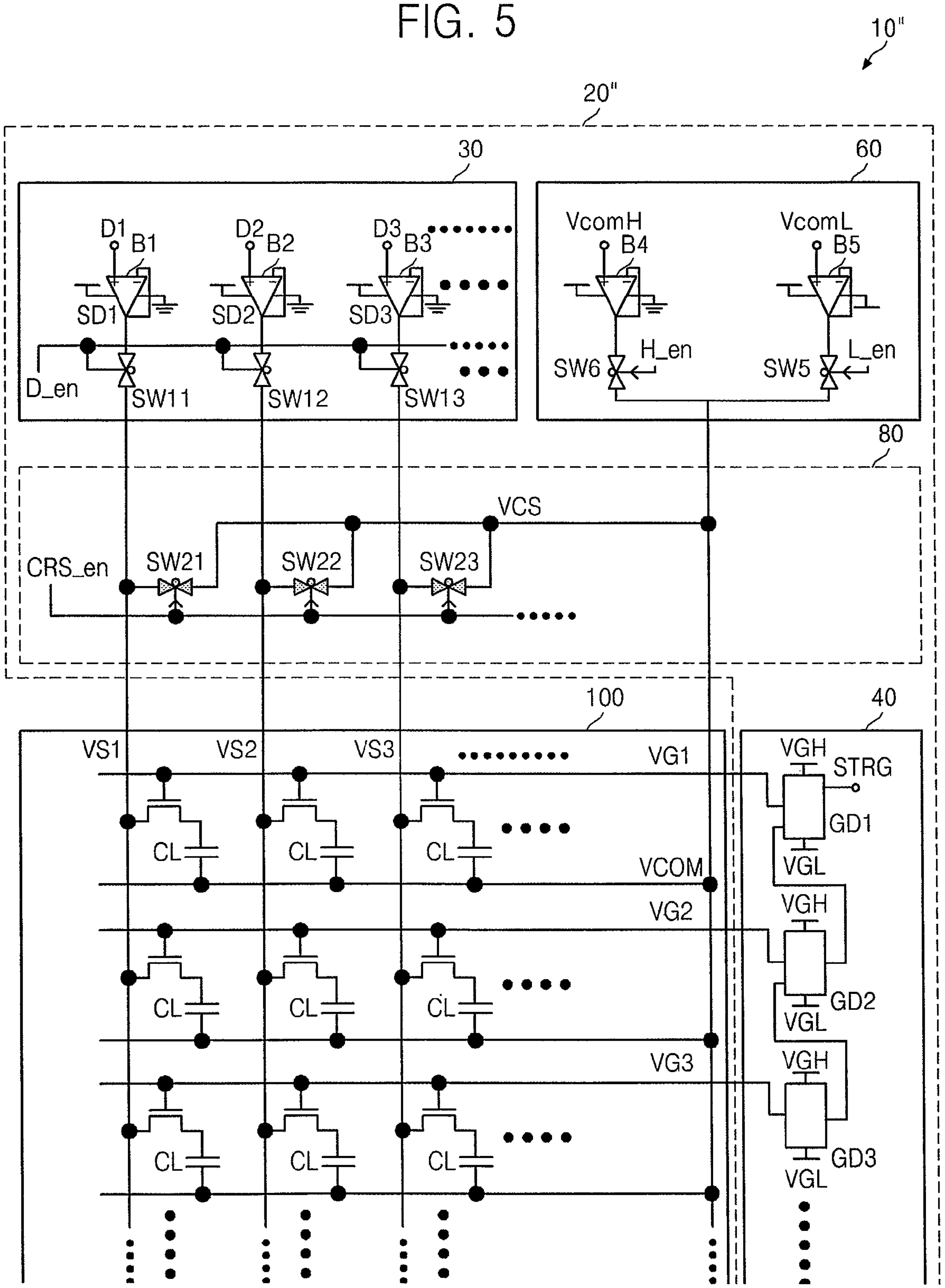
FIG. 5 illustrates a circuit diagram of a display device including a charge sharing circuit instead of the control circuit illustrated in FIG. 2.

FIG. 5 illustrates a circuit diagram of a display device 10" including a charge sharing circuit 80 instead of the control circuit 70 illustrated in FIG. 2. The charge sharing circuit 80 maintains the source lines S1, S2, and S3 and the common electrode VCOM at a common voltage VCS in response to the control signal CRS_en. A power consumption P3 of a driving circuit 20" is expressed by Equation (3):

$$P3 = N \times CL \times \frac{1}{2} \times f \times VDD \times (3(VSH - VCOML) + 2(VCOMH - VSL)) \tag{3}$$

Figure 6:
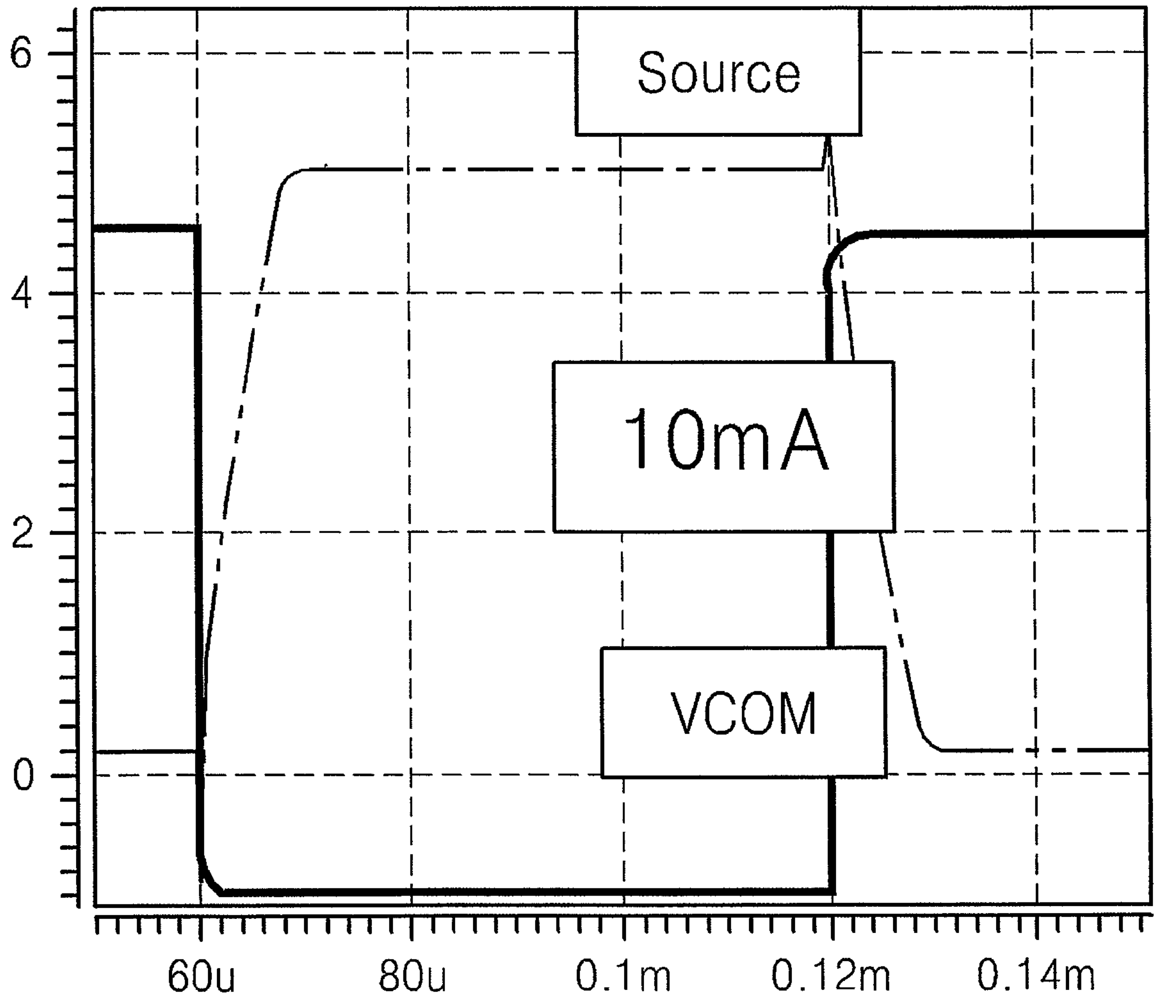
FIG. 6 illustrates a graph showing the source driving voltage, the common voltage, and the current consumption of a driving circuit in the display device illustrated in FIG. 4.
Figure 7:
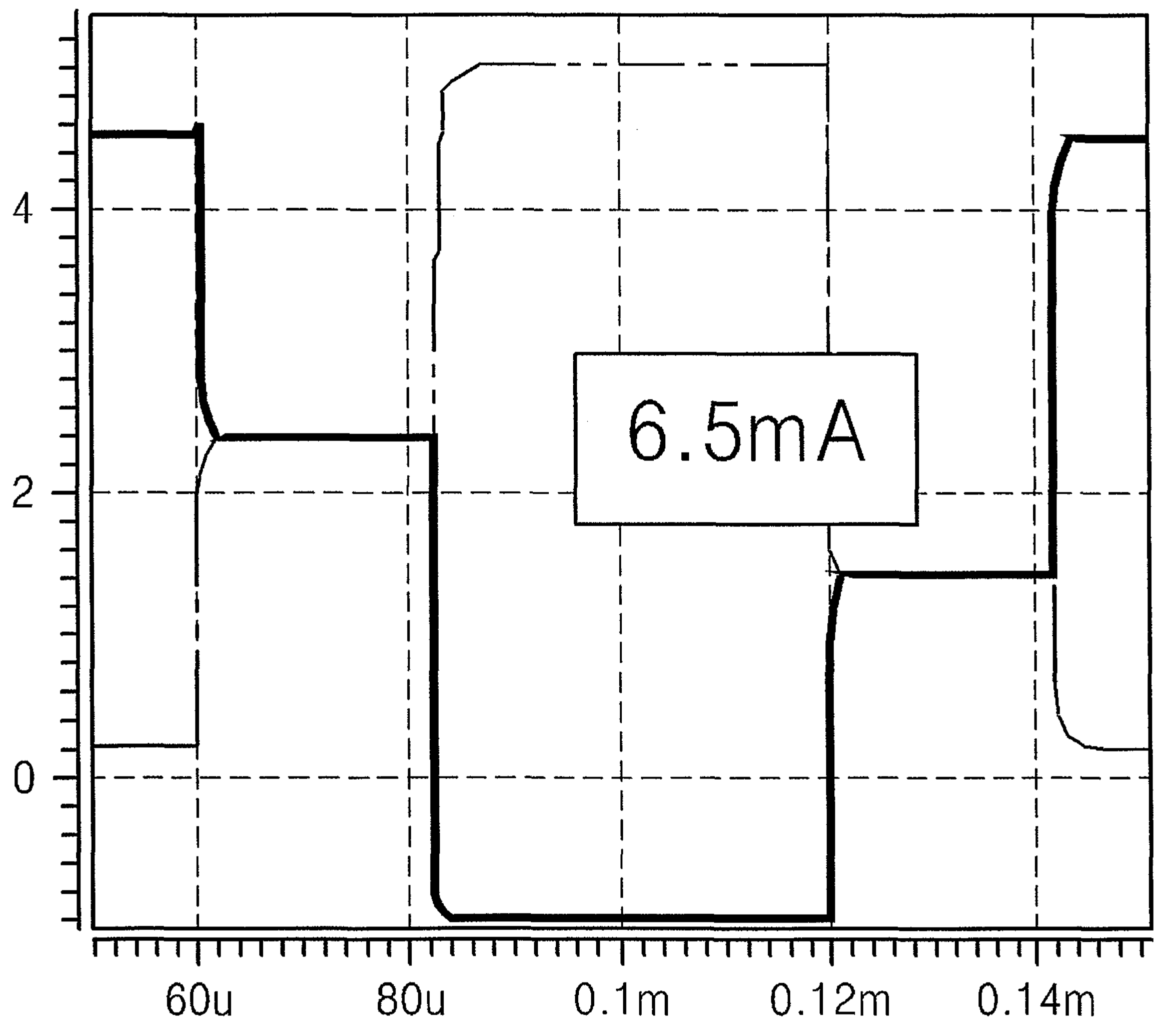
FIG. 7 illustrates a graph showing the source driving voltage, the common voltage, and the current consumption of a driving circuit in the display device illustrated in FIG. 5.
Figure 8:
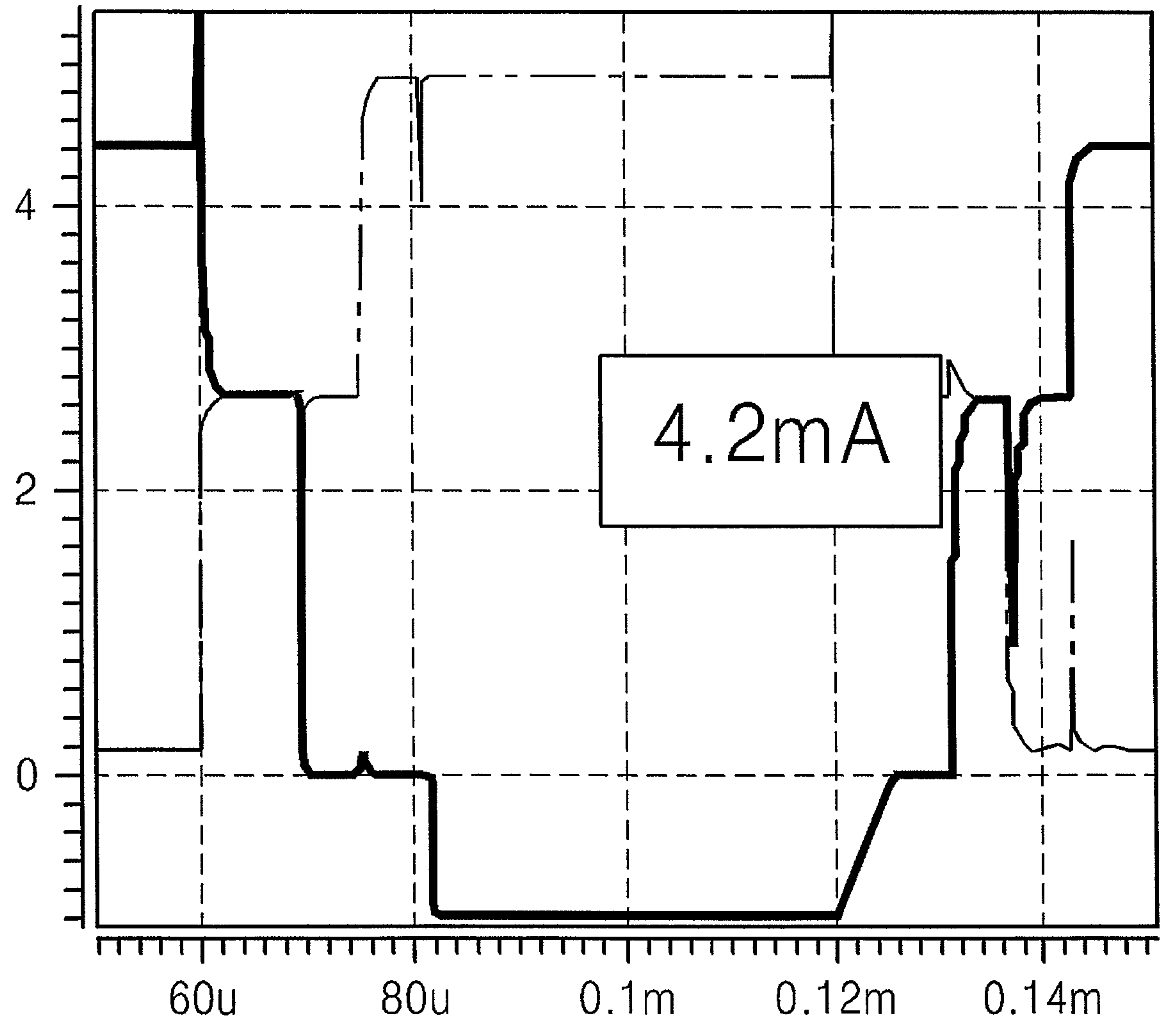
FIG. 8 illustrates a graph showing the source driving voltage, the common voltage, and the current consumption of a driving circuit in the display device illustrated in FIG. 2.

FIG. 6 illustrates a graph showing the source driving voltage VS, the common voltage VCOM, and a current consumption of the driving circuit 20' in the display device 10' illustrated in FIG. 4. FIG. 7 illustrates a graph showing the source driving voltage VS, the common voltage VCOM, and a current consumption of the driving circuit 20" in the display device 10" illustrated in FIG. 5. FIG. 8 illustrates a graph showing the source driving voltage VS, the common voltage VCOM, and a current consumption of the driving circuit 20 in the display device 10 illustrated in FIG. 2.

In FIGS. 6 through 8, the solid lines indicate the common voltage VCOM and the long dashed double-dotted lines indicate the source driving voltage VS. Referring to FIGS. 6 through 8, the display device 10' illustrated in FIG. 4 has a largest current consumption of 10 mA. The display device 10" illustrated in FIG. 5 has a current consumption of 6.5 mA. The display device 10 illustrated in FIG. 2 has a least current consumption of 4.2 mA. Accordingly, it can be inferred that the display device 10 according to some embodiments reduces the power consumption of the driving circuit 20 due to the operation of the control circuit 70. Referring to Equations (1) through (3) and FIGS. 6 through 8, the power consumption of the driving circuit 20 included in the display device 10 is reduced due to the operation of the control circuit 70 controlling the source driving voltage VS and the common voltage VCOM.

Figure 9:
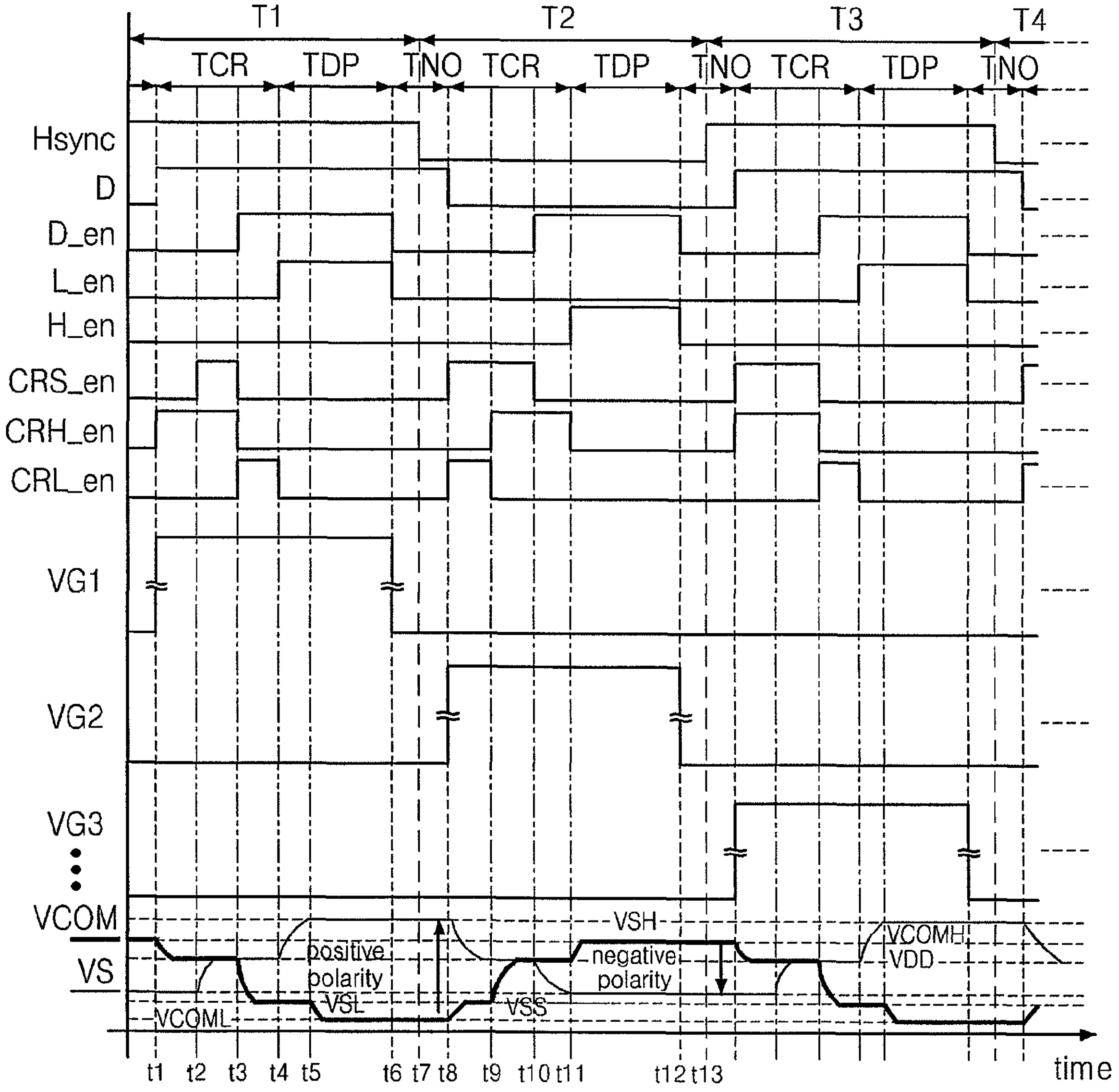
FIG. 9 illustrates a timing chart of the operation of the driving circuit of the display device, illustrated in FIG. 2, for reducing current consumption according to an embodiment.

FIG. 9 illustrates a timing chart of the operation of the driving circuit 20 illustrated in FIG. 2 for reducing current consumption according to another embodiment. The timing chart illustrated in FIG. 9 is the same as that illustrated in FIG. 3, with the exception that the timing of the control signals CRS_en, CRH_en, and CRL_en are changed. Thus, descriptions of operations other than operations involving the control signals will be omitted.

At a time t1 when the source driving voltage D is applied to a buffer of the source driving circuit 30, the second control circuit 70*b* applies the power supply voltage VDD to the common electrode VCOM in response to the control signal CRH_en and the gate driving circuit 40 applies the first gate voltage VG1 to the gate line G1. Then, the common voltage VCOM transits from the second common voltage VCOMH to the power supply voltage VDD.

At a time t2, the first control circuit 70*a* applies the power supply voltage VDD to the source line Sx in response to the control signal CRS_en. Then, the source driving voltage VS transits from the first source driving voltage VSL to the power supply voltage VDD.

At a time t3, the second control circuit 70*b* applies the ground voltage VSS to the source line Sx in response to the control signal CRL_en. Then, the common voltage VCOM transits from the power supply voltage VDD to the ground voltage VSS.

At a time t4, the switch SW1x of the source driving circuit 30 outputs a signal in response to the control signal D_en. Then, the source driving voltage VS transits from the power supply voltage VDD to the second source driving voltage VSH.

At a time t5, the switch SW5 of the common voltage driving circuit 60 outputs the first common voltage VCOML to the common electrode VCOM in response to the control signal L_en. Then, the common voltage VCOM transits from the ground voltage VSS to the first common voltage VCOML.

At a time t6, the gate voltage VG1 is deactivated. At a time t7, the horizontal synchronous signal Hsync transits to the low level. In a period from the time t1 to the time t7 described above, the common voltage VCOM transits from the second common voltage VCOMH to the first common voltage VCOML and the source driving voltage VS transits from the first source driving voltage VSL to the second source driving voltage VSH.

In a period from a time t8 to a time t13, the common voltage VCOM transits from the first common voltage VCOML to the second common voltage VCOMH and the source driving voltage VS transits from the second source driving voltage VSH to the first source driving voltage VSL. The transition procedure in the period from the time t8 to the time t13 is similar to that in the period from the time t1 to the time t7. Thus, a detailed description thereof will be omitted. After the time t13, the operation performed in a period from the time t1 to the time t13 is repeated.

While the power supply voltage VDD is simultaneously applied to the source line Sx and the common electrode VCOM at the time t1 in the timing chart illustrated in FIG. 3, the power supply voltage VDD is applied to the common electrode VCOM and the source line Sx at different times, i.e., at the times t1 and t2, respectively, in the timing chart illustrated in FIG. 9. The operation illustrated in FIG. 9 is provided to reduce power consumption occurring due to surge current that may occur when the power supply voltage VDD is simultaneously applied to the source line Sx and the common electrode VCOM. When the driving circuit 20 of the display device 10 operates according to the timing chart illustrated in FIG. 9, a power consumption P4 of the driving circuit 20 is expressed by Equation (4):

$$P4 = N \times CL \times \frac{1}{2} \times f \times VDD \times (VSH - VSL + VCOMH - 2VCOML) \quad (4)$$

Referring to Equations (3) and (4), the power consumption P4 of the driving circuit 20 according to the embodiments illustrated in FIG. 9 is less than the power consumption P3 of the driving circuit 20 according to the embodiments illustrated in FIG. 3. In other words, when the power supply voltage VDD is applied to the source line Sx and the common electrode VCOM at different times, the power consumption of the driving circuit 20 is more reduced.

The table below shows the power saving ratios (PSRs) of the display device 10" illustrated in FIG. 5, the display device 10 illustrated in FIG. 2 operating according to the timing chart illustrated in FIG. 3, and the display device 10 operating according to the timing chart illustrated in FIG. 9 with respect to the driving circuit 20' of the display device 10' illustrated in FIG. 4.

| PSR (%) | | |
|---|---|---|
| FIG. 5 | FIG. 2 (timing chart of FIG. 3) | FIG. 2 (timing chart of FIG. 9) |
| 48 | 75 | 78 |

The power consumptions of the driving circuits were calculated using Equations (1) through (4) and it was assumed that the power supply voltage VDD was 2.8 V, the first common voltage VCOML was 1V, the second common voltage VCOMH was 4.5 V, the first source driving voltage VSL was 0.2 V, and the second source driving voltage VSH was 5 V. It can be seen from the table that, compared to the display device 10' illustrated in FIG. 4, the driving circuit 20" of the display device 10" illustrated in FIG. 5 reduces power consumption by 45%, the driving circuit 20 of the display device 10 operating according to the timing chart illustrated in FIG. 3 reduces power consumption by 75%, and the driving circuit 20 of the display device 10 operating according to the timing chart illustrated in FIG. 9 reduces power consumption by 78%.

Figure 10:
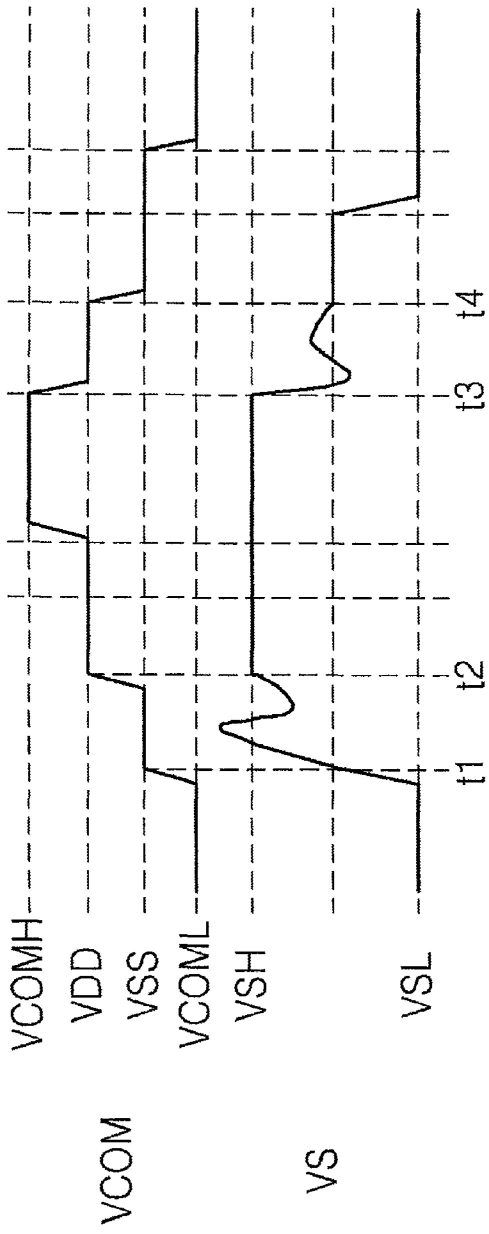
FIG. 10 illustrates a timing chart of the operation of reducing current consumption of a source driving circuit and a common voltage driving circuit, illustrated in FIG. 2, according to an embodiment.

FIG. 10 illustrates a timing chart of the operation of reducing current consumption of the source driving circuit 30 and the control circuit 60, illustrated in FIG. 2, according to an embodiment. In detail, the timing chart illustrated in FIG. 10 shows the operations of the control circuit 70 controlling the source driving voltage VS when a voltage applied to the common electrode VCOM and the source driving voltage VS change in phase with each other. The operations will be described with reference to FIGS. 1, 2, and 10 below.

The control circuit 70 can float the source line Sx for a predetermined period of time when the common voltage VCOM and the source driving voltage VS change in phase with each other. Referring to FIG. 10, the control circuit 70 can float the source line Sx during a period from a time t1 when a voltage applied to the common electrode VCOM reaches the ground voltage VSS to a time t2 when the voltage reaches the power supply voltage VDD and a period from a time t3 to a time t4 during which the voltage applied to the common electrode VCOM transits from the second common voltage VCOMH to the power supply voltage VDD.

During a predetermined period of time while the source line Sx is floated, the source driving voltage VS rises or drops based on the change of the common voltage VCOM regardless of a voltage applied by the control circuit 70. Accordingly, due to the operation of the control circuit 70 floating the source line Sx, the power consumption of the source driving circuit 30 is reduced.

Figure 11:
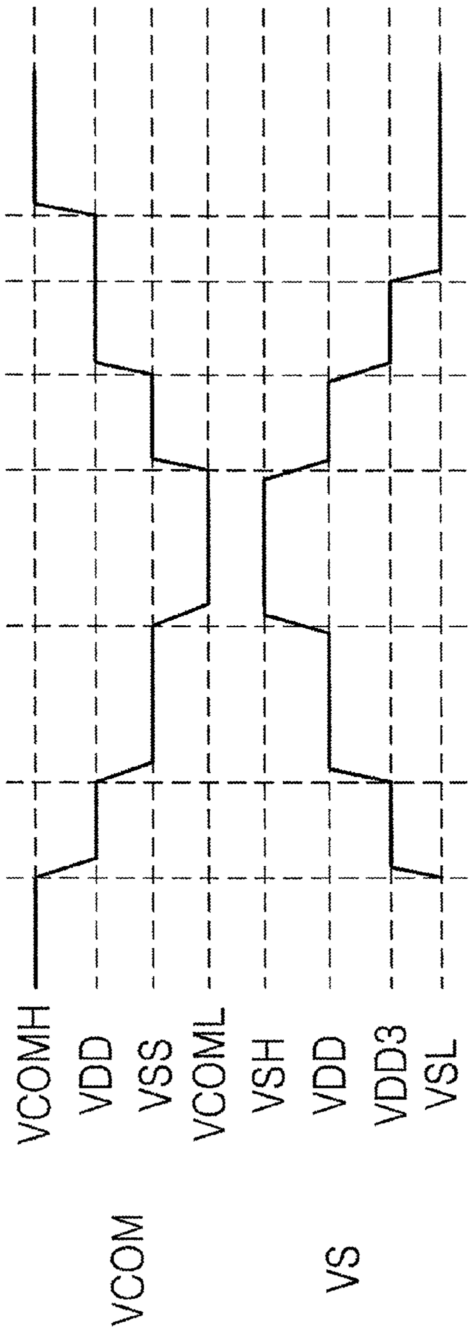
FIG. 11 illustrates a timing chart of the operation of reducing current consumption of the source driving circuit and the common voltage driving circuit, illustrated in FIG. 2, according to an embodiment.

FIG. 11 illustrates a timing chart of the operation of reducing current consumption of the source driving circuit 30 and the common voltage driving circuit 60, illustrated in FIG. 2, according to another embodiment. In detail, the timing chart illustrated in FIG. 11 shows the operations of the control circuit 70 controlling the source driving voltage VS when a voltage applied to the common electrode VCOM and the source driving voltage VS change out of phase with each other. The operations will be described with reference to FIGS. 1, 2, and 11 below.

The control circuit 70 can apply at least one more first external voltage VDD3 to the source line Sx in addition to the power supply voltage VDD before the source driving voltage VSH or VSL is applied to the source line Sx when the common voltage VCOM and the source driving voltage VS change out of phase with each other. Referring to FIG. 11, the control circuit 70 applies the external voltage VDD3 to the source line Sx in a period during which the source driving voltage VS rises from the first source driving voltage VSL to the power supply voltage VDD and in a period during which the source driving voltage VS drops from the power supply voltage VDD to the first source driving voltage VSL. As described above, the control circuit 70 reduces the power consumption of the source driving circuit 30 by dividing the rise of the source driving voltage VS into multiple steps. In other words, the control circuit may reduce power consumption of the source driving circuit 30 by controlling the rise of the source driving voltage VS in a nonlinear, e.g., stepwise, manner.

The control circuit 70 compares a digital signal corresponding to a current source driving voltage output from the source driving circuit 30 with a digital signal corresponding to a previous source driving voltage and determines whether the voltage applied to the common electrode VCOM and the source driving voltage VS change in phase or out of phase with each other based on a result of the comparison. For instance, the control circuit 70 may compare a predetermined number of upper bits in the current digital signal with corresponding upper bits in the previous digital signal to determine whether the voltage applied to the common electrode VCOM and the source driving voltage VS change in phase or out of phase with each other.

The non-volatile RAM 100 and/or the SSD 200 according to some embodiments may be packed in various types of packages. For example, the various packages may include Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and so forth.

Some embodiments may be embodied in hardware, software, firmware or combination thereof When the operation method of a non-volatile RAM according to some embodiments or the operation method of an SSD according to some embodiments is embodied in software, it may be embodied as computer readable codes or programs on a computer readable recording medium. The computer readable recording medium is any data storage device that can store data which can be thereafter read by a computer system. The computer readable recording medium may be tangible and non-transitory, and examples may include read-only memory (ROM), random-access memory (RAM), electrically erasable programmable ROM (EEPROM), and flash memory.

In the above embodiments, a display device including an LCD panel and a driving circuit included therein have been described as examples, but embodiments are not limited thereto. For instance, a display device according to some embodiments may be a plasma display panel (PDP) or an electroluminescence display panel and a driving circuit may be for driving the PDP or the electroluminescence display panel.

As described above, according to some embodiments, a driving circuit reduces the power consumption of a source driving circuit and a common voltage driving circuit in a display device, thereby reducing the driving current of the display device.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A driving circuit driving a display panel, the driving circuit comprising:

a source driving circuit configured to apply a source driving voltage to a source line of the display panel;

a common voltage driving circuit configured to alternately apply a first common voltage and a second common voltage higher than the first common voltage to a common electrode of the display panel; and a control circuit configured to apply at least one first external voltage to the source line before the source driving voltage is applied to the source line and configured to apply at least two second external voltages to the common electrode at different times within a same period before the first common voltage is applied to the common electrode or the second common voltage is applied to the common electrode, wherein, after the first external voltage and the at least two second external voltages have been applied, voltages of the source line and the common electrode are different, wherein the at least two second external voltages are applied to the common electrode toward producing a same polarity relative to at least one pixel in the display panel.

2. The driving circuit as claimed in claim 1, wherein the control circuit comprises:

a first control circuit configured to apply the first external voltage to the source line in response to a first control signal; and a second control circuit configured to apply the at least two second external voltages to the common electrode in response to at least two second control signals.

3. The driving circuit as claimed in claim 1, wherein the first external voltage has a value between a maximum and a minimum of the source driving voltage and the at least two second external voltages have values between the first common voltage and the second common voltage.

4. The driving circuit as claimed in claim 1, wherein the control circuit applies the at least two second external voltages to the common electrode sequentially from a highest to a lowest voltage before the first common voltage is applied to the common electrode and applies the at least one second external voltage to the common electrode sequentially from the lowest to the highest voltage before the second common voltage is applied to the common electrode.

5. The driving circuit as claimed in claim 1, wherein the first external voltage and a second external voltage corresponding to the first external voltage among the at least two second external voltages are applied to the source line and the common electrode, respectively, at substantially a same time within the same period.

6. The driving circuit as claimed in claim 1, wherein the first external voltage and a second external voltage corresponding to the first external voltage among the at least two second external voltages are applied to the source line and the common electrode, respectively, at different times.

7. The driving circuit as claimed in claim 1, wherein the control circuit floats the source line during a predetermined period of time when a voltage applied to the common electrode and the source driving voltage change in phase with each other.

8. The driving circuit as claimed in claim 7, wherein the control circuit compares a digital signal corresponding to a current source driving voltage with a digital signal corresponding to a previous source driving voltage and determines whether the voltage applied to the common electrode and the source driving voltage change in phase or out of phase with each other based on a result of the comparison.

9. The driving circuit as claimed in claim 1, wherein the control circuit applies at least one more first external voltage before the source driving voltage is applied to the source line when a voltage applied to the common electrode and the source driving voltage change out of phase with each other.

10. The driving circuit as claimed in claim 9, wherein the control circuit compares a digital signal corresponding to a current source driving voltage with a digital signal corresponding to a previous source driving voltage and determines whether the voltage applied to the common electrode and the source driving voltage change in phase or out of phase with each other based on a result of the comparison.

11. The driving circuit as claimed in claim 1, wherein the control circuit applies the first external voltage in a nonlinear manner before the source driving voltage is applied to the source line when a voltage applied to the common electrode and the source driving voltage change out of phase with each other.

12. The driving circuit as claimed in claim 11, wherein the nonlinear manner is a stepwise manner.

13. A display device comprising the driving circuit as claimed in claim 1.

14. The driving circuit as claimed in claim 1, wherein:

when, before operation of-the control circuit, the voltage of the source line is less than the voltage of the common electrode, then after the first external voltage and the at least two second external voltages have been applied, the voltage of the source line is greater than the voltage of the common electrode; and when, before operation of the control circuit, the voltage of the source line is greater than the voltage of the common electrode, then after the first external voltage and the at least two second external voltages have been applied, the voltage of the source line is less than the voltage of the common electrode.

15. The driving circuit as claimed in claim 1, wherein the at least one first external voltage includes at least two first external voltages, the at least two first external voltages changing in a first polarity and the at least two second external voltages changing in a second polarity, opposite the first polarity.

16. The driving circuit as claimed in claim 15, wherein periods, during which the at least two first external voltages and the at least two second external voltages are applied, overlap.

17. The driving circuit as claimed in claim 16, wherein periods, during which the at least two first external voltages and the at least two second external voltages are applied, completely overlap.

18. The driving circuit as claimed in claim 1, wherein the control circuit is configured to always apply a voltage equal to or greater than a lowest source driving voltage to be applied to the source line by the source driving circuit.

19. The driving circuit as claimed in claim 1, wherein the control circuit is configured to respond to a single enable signal to apply the first external voltage to the source line and to respond to two enable signals to apply that at least two second external voltages to the common electrode.

20. The driving circuit as claimed in claim 19, wherein at least one of the single enable signal and the two enable signals have a period that is different than periods of remaining enable signals.

21. The driving circuit as claimed in claim 1, wherein at least one of the two second external voltages at least substantially equals the first external voltage.

22. The driving circuit as claimed in claim 1, wherein the same period is before a period in which image data is to be displayed.

23. The driving circuit as claimed in claim 1, wherein:

a voltage of the common electrode and a voltage of the source line are set to substantially a same reference voltage for a predetermined sub-period within the same period, the reference voltage is between the at least two external voltages applied to the common electrode, the reference voltage is between the first common voltage and the second common voltage.

24. The driving circuit as claimed in claim 23, wherein the voltage of the common electrode decreases from the reference voltage to a first value and the voltage of the source line increases from the reference voltage to a second value different from the first value when the at least one pixel in the display panel is to have a positive polarity.

25. The driving circuit as claimed in claim 24, wherein the voltage of the common electrode increases from the reference voltage to a third value and the voltage of the source line decreases from the reference voltage to a fourth value different from the third value when the at least one pixel in the display panel is to have a negative polarity.

26. The driving circuit as claimed in claim 25, wherein the first, second, third and fourth values are different values.

27. The driving circuit as claimed in claim 1, wherein:

a voltage of the common electrode changes from a first value to a second value based on the at least two second external voltages applied at different times within the same period.

* * * * *